United States Patent
Schmidt et al.

(10) Patent No.: US 6,674,392 B1
(45) Date of Patent: Jan. 6, 2004

(54) AUTOMOTIVE RADAR SYSTEM

(75) Inventors: Ewald Schmidt, Ludwigsburg (DE); Klaus Voigtlaender, Wangen (DE); Bernhard Lucas, Besigheim (DE); Joerg Schneemann, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,318

(22) PCT Filed: Mar. 11, 2000

(86) PCT No.: PCT/DE00/03861
§ 371 (c)(1), (2), (4) Date: May 9, 2002

(87) PCT Pub. No.: WO01/48511
PCT Pub. Date: Jul. 5, 2001

(30) Foreign Application Priority Data

Dec. 24, 1999 (DE) .......................... 199 63 004

(51) Int. Cl.⁷ .................... G01S 13/93; H01Q 1/02
(52) U.S. Cl. .............. 342/70; 343/704; 343/872; 343/873
(58) Field of Search .................. 342/5–11, 70, 342/71, 72, 175, 118, 128, 129–133, 146, 147, 159, 169, 173, 174, 27, 28; 343/872, 873, 704

(56) References Cited

U.S. PATENT DOCUMENTS

| | | | |
|---|---|---|---|
| 3,805,017 A | * | 4/1974 | Roberts et al. ............ 343/704 |
| 4,866,452 A | | 9/1989 | Barma et al. |
| 5,528,249 A | * | 6/1996 | Gafford et al. ............ 343/704 |
| 6,175,335 B1 | * | 1/2001 | Ishikawa et al. ............ 343/704 |

FOREIGN PATENT DOCUMENTS

| | | | |
|---|---|---|---|
| DE | 44 29 841 | 11/1995 | |
| DE | 196 26 344 | 9/1997 | |
| DE | 196 44 164 | 4/1998 | |
| DE | 197 24 320 | 12/1998 | |
| DE | 19724320 A1 * | 12/1998 | ............ H01Q/1/02 |
| DE | 197 41 081 | 3/1999 | |
| JP | 10-56309 A * | 2/1998 | ............ H01Q/1/02 |
| JP | 10 086851 | 4/1998 | |
| JP | 10-132921 A * | 5/1998 | ............ G01S/7/03 |
| JP | 2000-22437 A * | 1/2000 | ......... H01Q/15/08 |
| JP | 2002-22821 A * | 1/2002 | ............ G01S/7/03 |

* cited by examiner

Primary Examiner—Bernarr E. Gregory
(74) Attorney, Agent, or Firm—Kenyon & Kenyon

(57) ABSTRACT

A motor-vehicle radar system provided with at least one housing includes at least one send/receive element for sending and/or receiving electromagnetic waves, at least one first dielectric member in the beam path of the electromagnetic waves, and at least one arrangement of electrical conductor tracks which are in direct contact with the first dielectric member. It is possible to supply an electric power to the electrical conductor tracks, the electrical conductor tracks preferably being used to heat the first dielectric member, and the electrical conductor tracks being made of a material having a pronounced, positive temperature coefficient (PTC characteristic).

15 Claims, 2 Drawing Sheets

AUTOMOTIVE RADAR SYSTEM

FIELD OF THE INVENTION

The present invention relates to a motor-vehicle radar system.

BACKGROUND INFORMATION

Motor-vehicle radar systems are used within the framework of an automatic cruise control system of a vehicle for detecting vehicles driving ahead. A system of this type is also known as Adaptive Cruise Control (ACC). To influence the electromagnetic waves used and occasionally to protect the radar system from weather influences, as well, usually a member is situated in the beam path of the electromagnetic waves. This member is often a component of a housing which surrounds such a motor-vehicle radar system.

The German Published Patent Application No. 197 24 320 describes a method for producing a heatable antenna lens. A heatable antenna lens is described made of a dielectric member which possesses an arrangement of electrical conductor tracks therein. The arrangement of electrically conductive tracks is situated as near as possible to the outer surface of the lens to be heated, a reduction of heating power thereby resulting by introducing the energy close underneath the surface to be heated. Also resulting from this is an accelerated heat-up characteristic. It is furthermore described that easy adaptability of the heating power can be achieved by using wires having a desired resistance characteristic. For example, it can be a resistance wire.

The German Published Patent Application No. 196 26 344 describes a lens for focusing millimetric waves, particularly for distance sensors for motor vehicles, which are made at least partially of a ceramic material or a plastic, e.g. polypropylene or polycarbonate, filled with ceramic material. For example, aluminum oxide with magnesium-oxide and potassium-oxide constituents is provided as ceramic material. Lenses made purely of a ceramic material can be produced according to German Published Patent Application No. 196 26 344 by pressing, tempering or sintering, and lenses made of plastics filled with ceramic material can be produced in the injection-molding process. One specific embodiment of German Published Patent Application No. 196 26 344 provides for applying a protective coating on the surface of the lens which protects the outwardly-directed lens surface at least from weather influences. Hexamethyl disiloxane is applicable for the protective coating in particular for plastic lenses filled with ceramic material. A further form of German Published Patent Application No. 196 26 344 provides for a convex-plane lens, the convex or the plane surface being alternatively subject to the weather influences in the installed state. To reduce reflection losses, German Published Patent Application No. 196 26 344 allows for providing at least one surface of the lens with grooves which can be filled with a dielectric material in order to lend a plane surface to the lens. The dielectric material can have an inhomogeneous distribution of the dielectric constant in the direction of the optical axis of the lens and/or transverse thereto.

The German Patent No. 197 41 081 describes a method for producing an antenna lens. The method provides that a rigid shell, predetermining the shape of the lens and forming the anti-reflection layer, is produced, and that the cavity of the shell is filled in with a liquefied, powdery or pasty material forming the lens core. The shell can be made of a plastic (for example, plexiglass, polycarbonate or similar materials), while, for example, plastics and mixtures of plastic with ceramic materials (e.g. polyethylene, polypropylene, $Al_2O_3$, $TiO_2$ or $CaZO_x$) are provided as material for the lens core. According to German Patent No. 197 41 081, the surface of the shell can be designed both to be smooth, and can have any structure at all, for example, a Fresnel structure. So that the shell forms an ideal antireflection layer for the lens, German Patent No. 197 41 081 C1 proposes that the shell be manufactured from a plastic whose dielectric constant corresponds to the square root of the dielectric constant of the actual lens material (the filling). Furthermore, it can be inferred from German Patent No. 197 41 081 that, by very high dielectric constants ($\epsilon$>9) of the dielectric lens material, compact designs can be implemented having short focal lengths.

From the German Patent No. 196 44 164, a motor-vehicle radar system is known having at least one send/receive element for sending and/or receiving electromagnetic waves, a lens-shaped dielectric member being arranged in the beam path of the at least one send/receive element to focus or scatter the electromagnetic waves. The lens-shaped dielectric member, which additionally protects the send/receive element from weather influences, has an arrangement of electrically conductive tracks whose breadth is tenth wave at the most, and whose distances from one another are at least a quarter wave, Lambda designating the free-space wavelength of the electromagnetic waves. The electrically conductive tracks are arranged predominately in a direction perpendicular to the polarization direction of the electromagnetic waves. Depending on the desired use, the arrangement of electrically conductive tracks can be disposed on the inner side of the dielectric member, i.e. the side facing the send/receive elements, the outer side, or even within the dielectric member. If a heating current flows through the electrically conductive arrangement, the dielectric member can thereby be freed from coatings such as ice, snow or slush. In the same way, the dielectric member can be dried or kept dry with the aid of a heating current. It is also disclosed that the electrically conductive arrangement may be subdivided into at least two portions separate from each other. When working with this configuration, if the arrangement of electrically conductive tracks is on the outer side of the dielectric member, it is possible to infer a so-called loss angle tan $\delta$ of the coating material on the basis of the measurement of the capacitance between the two separate portions of the arrangement. In other words, a soiling of the dielectric member can be determined. In dependence on this determined soiling, i.e. a determined dirt coating, a heating current can be switched on which flows through the electrically conductive arrangement. On the other hand, due to the division into at least two regions, the heating power can be varied, for example, to quickly heat up an ice-covered lens using a high heating power, and subsequently keeping the lens free using a reduced heating power. It is further known from German Patent No. 196 44 164 that when working with a lens member made of ceramic, the electrical conductor tracks are applied using known thick-film technology, while for members made of plastic, likewise known, cost-effective methods can be used for imprinting the electrical conductor tracks. It can be inferred from one exemplary embodiment in German Patent No. 196 44 164 that a lens can be provided, composed of two partial lenses, which is made of two plane-convex partial lenses of different materials. In this case, the electrical conductor tracks can be arranged in one plane between the plane surfaces of the two partial lenses.

German Published Patent Application No. 197 24 320, German Published Patent Application No. 196 26 344, German Patent No. 197 41 081 and German Patent No. 196 44 164 describe various forms of antenna lenses which can be used in a motor-vehicle radar system. German Published Patent Application No. 197 24 320 and German Patent No. 196 44 164 each include an arrangement of electrical conductor tracks which can be used, inter alia, to free the side of the antenna lens exposed to the influences of weather from coatings such as snow, ice or slush. Both patents describe the possibility of regulating the heating power, either in that the heating power can be adapted by wires having a desired resistance characteristic, or in that the electrically conductive arrangement is subdivided into at least two portions separate from one another.

SUMMARY OF THE INVENTION

Given a motor-vehicle radar system having at least one housing, having at least one send/receive element for sending and/or receiving electromagnetic waves, having at least one first dielectric member in the beam path of the electromagnetic waves, having at least one arrangement of electrical conductor tracks which are in direct contact with the first dielectric member, it being possible to supply an electric power to the electrical conductor tracks and the electrical conductor tracks preferably being used to heat the first dielectric member, the motor-vehicle radar system of the present invention is further developed compared to the related art in that the electrical conductor tracks are made of a material having a pronounced, positive temperature coefficient (PTC characteristic). The result of this use, according to the present invention, of a material with a pronounced, positive temperature coefficient is that, with rising temperature, the electrical resistance of the electrical conductor tracks increases very sharply. A type of self-regulating behavior thereby sets in, in that as the temperature rises, the heating power is reduced because of the increasing resistance. Assuming a constant motor-vehicle electrical-system voltage, this means that the heating power is inversely proportional to the heating power. Suitable dimensioning of the electrical conductor tracks and the selection of the appropriate material with pronounced PTC characteristic eliminates the need for a complicated and cost-creating open-loop or closed-loop control of the electrical heating power, since this function is ensured by the self-regulating effect of the electrical conductor tracks.

Advantageously, the distance of the electrical conductor tracks to one another corresponds essentially to an odd multiple of a quarter of the free-space wavelength of the electromagnetic waves used. This design results in a minimal influencing of the electromagnetic waves.

The preferred further development of the motor-vehicle radar system according to the present invention provides that the first dielectric member is a lens for focusing or scattering the electromagnetic waves.

An advantageous further refinement is that the first dielectric member is made of a ceramic material, and that the electrical conductor tracks are produced from an electrically conductive printing paste which is applied on the dielectric-member surface facing the send/receive elements. Due to this constructive design of the present invention, a type of "ceramic heating stone" having self-regulating effect is produced. In this context, it is advantageous if the electrical conductor tracks form a level arrangement, since this is associated with the lowest costs with respect to producing the electrical conductor tracks.

Another further development provides that a covering layer, made of a thermoplastic material, is applied on the first dielectric member at least on the side facing away from the send/receive elements, the covering layer enclosing the first dielectric member in such a way that the covering layer represents a seal with respect to the housing. In this case, the covering layer is dimensioned such that the dielectric constant of the covering layer corresponds approximately to the square root of the dielectric constant of the first dielectric member, and that the layer thickness of the covering layer corresponds to an odd multiple of a quarter of the free-space wavelength of the electromagnetic waves used. This arrangement and dimensioning of the covering layer according to the present invention permits the covering layer to be used as a reflection-damping adaptation layer which protects the motor-vehicle radar system from weather influences.

A further refinement of the motor-vehicle radar system according to the present invention provides that at least one second dielectric member is arranged in the beam path of the electromagnetic waves, the second dielectric member being a lens for focusing or scattering the electromagnetic waves, and the second dielectric member being arranged between the send/receive elements and the first dielectric member. This design approach offers the advantage that the dielectric lens for focusing the electromagnetic waves can be produced independently of the first dielectric member. In this case, the preferred layout is such that the second dielectric member is not in direct contact with the first dielectric member.

DETAILED DESCRIPTION

Figure 1:
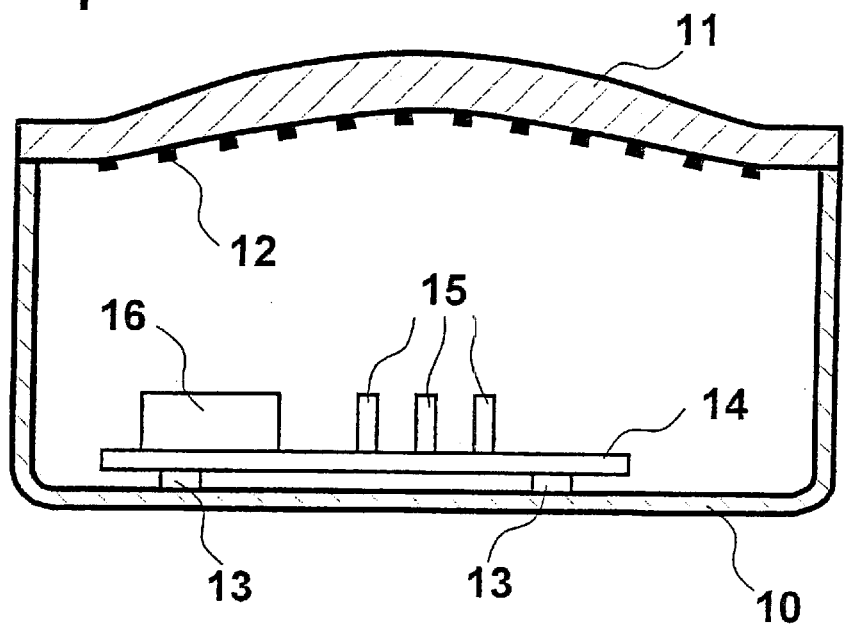
FIG. 1 shows a cross-section through a motor-vehicle radar system according to the present invention.

FIG. 1 shows a cross-section through a motor-vehicle radar system according to the present invention, which is not shown in all details in this representation. Thus, a motor-vehicle radar system of the present invention is composed essentially of a housing 10 which, in this exemplary embodiment, is terminated with a lens-shaped dielectric member 11. Arranged in direct contact with lens-shaped dielectric member 11 are electrically conductive tracks 12 according to the present invention which are made of a material having a pronounced, positive temperature coefficient (PTC characteristic). Within the housing, arranged on pedestals 13, is a base plate 14 upon which, in turn, send/receive elements 15 and further components 16 are arranged. In this exemplary embodiment, three send/receive elements 15 are shown by way of example. However, the present invention is not restricted to a specific number of sending and receiving elements. Not shown in the representation according to FIG. 1 are the connection contacts for the system to the motor vehicle, the electrical connections of electrically conductive tracks 12, diverse further electrical connection symbols, as well as mechanical mounting supports for the installation in a motor vehicle. Furthermore, in this exemplary embodiment, only one base plate 14 is shown, upon which send/receive elements 15 and components 16 are arranged. In a real specific embodiment, situated on base plate 14 would be a board upon which the further elements are arranged. Lens-shaped dielectric member 11 shown in this exemplary embodiment is used for focusing the electromagnetic waves which are sent out and received by send/receive elements 15. Generally, such a dielectric member can also be used for scattering the electromagnetic waves.

Figure 2:
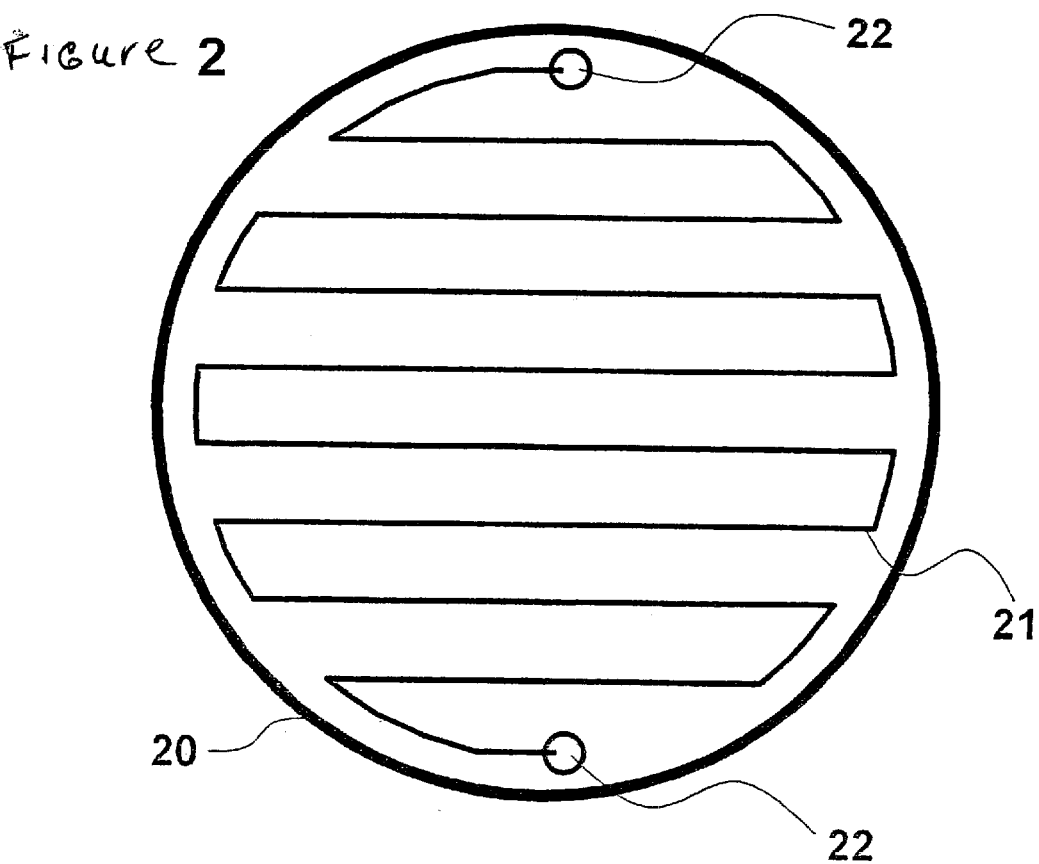
FIG. 2 shows a first exemplary embodiment of the motor-vehicle radar system according to the present invention.

FIG. 2 shows a first exemplary embodiment of the motor-vehicle radar system according to the present invention. FIG. 2 shows a top view of a dielectric member 20, in which electrically conductive tracks 21 are embedded in a meander form. Also shown are two connector contacts 22 which are used to produce the electrical contact to the electrically conductive tracks. In this context, the distance of the electrical conductor tracks to one another is so dimensioned that it corresponds essentially to an odd multiple of a quarter of the free-space wavelength of the electromagnetic waves used. This dimensioning ensures that the electromagnetic waves are only insignificantly influenced by the electrical conductor tracks. According to the present invention, the electrical conductor tracks are made of a material having a pronounced, positive temperature coefficient, that is to say, a material is used whose ohmic resistance increases sharply with rising material temperature.

Figure 3:
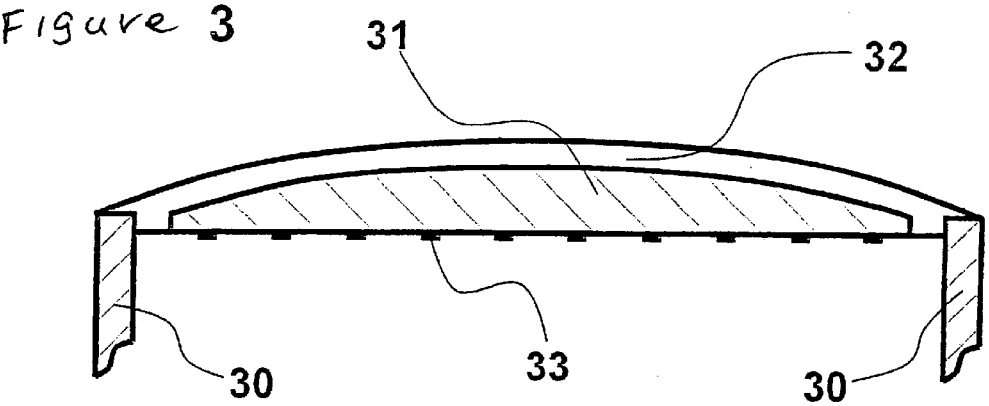
FIG. 3 shows a second exemplary embodiment of the motor-vehicle radar system according to the present invention.

FIG. 3 shows a second exemplary embodiment of the motor-vehicle radar system according to the present invention which, in this form, represents the preferred version of the present invention. FIG. 2 shows a housing 30 which, in this representation, is only shown schematically. Housing 30 is terminated in the beam direction of the electromagnetic waves with a dielectric member 31 that is covered by a covering layer 32 which at the same time represents the seal with respect to housing 30. According to the present invention, applied on the side of dielectric member 31 facing the send/receive elements (not shown here) are electrically conductive tracks 33 made of a material having a pronounced, positive temperature coefficient.

This preferred specific embodiment provides that dielectric member 31 is made of a ceramic material, for example, $Al_2O_3$, and that electrical conductor tracks 33 are produced from an electrically conductive printing paste. This specific embodiment according to the present invention has the advantage that the arrangement of electrically conductive tracks can be produced using a cost-effective method, for example, using thick-film technology or the screen-printing technique. The combination according to the present invention of electrically conductive tracks 33 made of a material having a pronounced PTC characteristic, and a dielectric lens 31 made of a ceramic material offers unusual advantages which come into play when used in a motor vehicle, particularly at low outside temperatures near the freezing point or below: Because a ceramic, which as a rule exhibits very good thermal conductivity (good thermal-conductivity value compared to, for example, plastic) has been selected as material for dielectric lens 31, in every case a uniform heating of the dielectric member is ensured. After the motor-vehicle radar system and the appropriate heating device, respectively, are put into operation, initially a high current (high electrical heating power: $P_{heat}=U_{MV}*U_{MV}/R_{PTC}$) flows through the electrically conductive tracks which, assuming constant motor-vehicle electrical-system voltage ($U_{MV}$), is limited only by the very low resistance ($R_{PTC}$) of the still cool, electrically conductive tracks 33. This leads to an accelerated heat-up characteristic of dielectric member 31. With rising temperature of electrically conductive tracks 33, and thus also of dielectric member 31, the resistance of electrical conductor tracks 33 increases sharply, the electrically supplied power thereby being limited by this self-regulating effect to a permissible continuous power output. The construction of dielectric lens 31 from ceramics also offers the advantage that a particularly thin dielectric member can be produced, which reduces the overall depth of the total system. This thin ceramic lens further offers the advantage that the pass-through attenuation is low, since the length of the path which the electromagnetic waves cover in the material is short. In addition, ceramic materials have a considerably lower loss coefficient than, for example, plastics.

According to the present invention, covering layer 32 shown in FIG. 3 is made of a thermoplastic material, e.g. polycarbonate. As can be seen from FIG. 3, covering layer 32 encloses dielectric member 31 in such a way that covering layer 32 represents a seal with respect to housing 30. Covering layer 32 is designed such that the dielectric constant of the covering layer corresponds approximately to the square root of the dielectric constant of dielectric member 31, and that the layer thickness of covering layer 32 corresponds to an odd multiple of a quarter of the free-space wavelength of the electromagnetic waves used. This design of covering layer 32 allows it to be used as a reflection-damping adaptation layer (this effect is known, for example, from anti-reflection coatings of eyeglass lenses), which in addition protects the motor-vehicle radar system from the influences of weather. When using polycarbonate as material for the covering layer, in addition a high impact resistance of the covering layer results which protects the underlying (ceramic) lens member from the stress of gravel impact typical for motor vehicles.

According to the present invention, the electrical conductor tracks are dimensioned in such a way that the permissible limiting temperature of the dielectric member, as of which damages could occur, is not exceeded. The specific design depends upon the exact material selection for the dielectric member and for the electrically conductive tracks, as well as further marginal conditions (e.g. the thickness of the dielectric member or the constancy of the motor-vehicle electrical-system voltage), and is left up to the person skilled in the art. A decisive advantage of the motor-vehicle radar system according to the present invention is that, given correct design of the electrically conductive tracks, it is possible to dispense with an additional, cost-creating open-loop/closed-loop control, and that nevertheless, the motor-vehicle radar system is freed quickly and reliably from snow and ice coatings.

Figure 4:
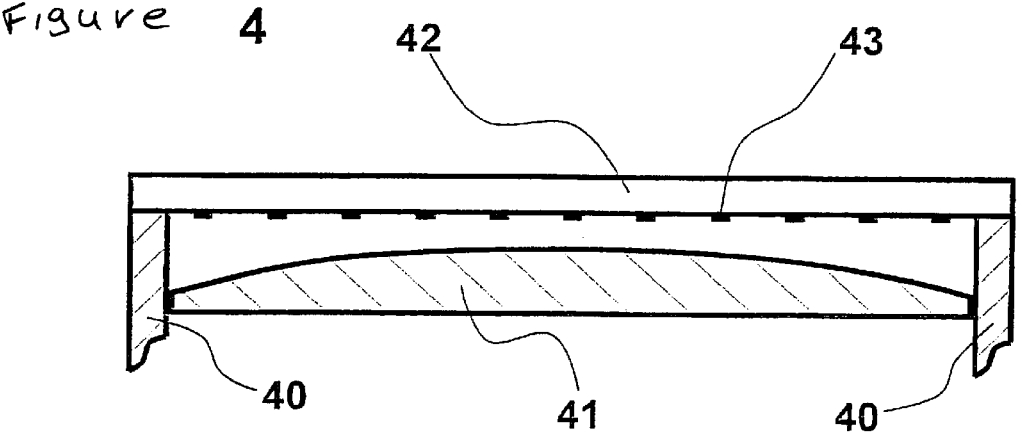
FIG. 4 shows a third exemplary embodiment of the motor-vehicle radar system according to the present invention.

FIG. 4 shows a third exemplary embodiment of the motor-vehicle radar system according to the present invention. Here, a housing 40 is shown which, analogous to FIG. 3, is indicated only schematically. Located in the beam direction in the exemplary embodiment according to FIG. 4 is, first of all, a dielectric member 41, and, in addition, a cover plate 42. In this case, dielectric member 41 is constructed as a dielectric lens. According to the present invention, electrically conductive tracks 43 made of a material having a pronounced, positive temperature coefficient are applied on the bottom side of cover plate 42. Cover plate 42 is designed as a radome without focusing effect, but can also be designed with an appropriate influence on the beam path of the electromagnetic waves.

Figure 5:
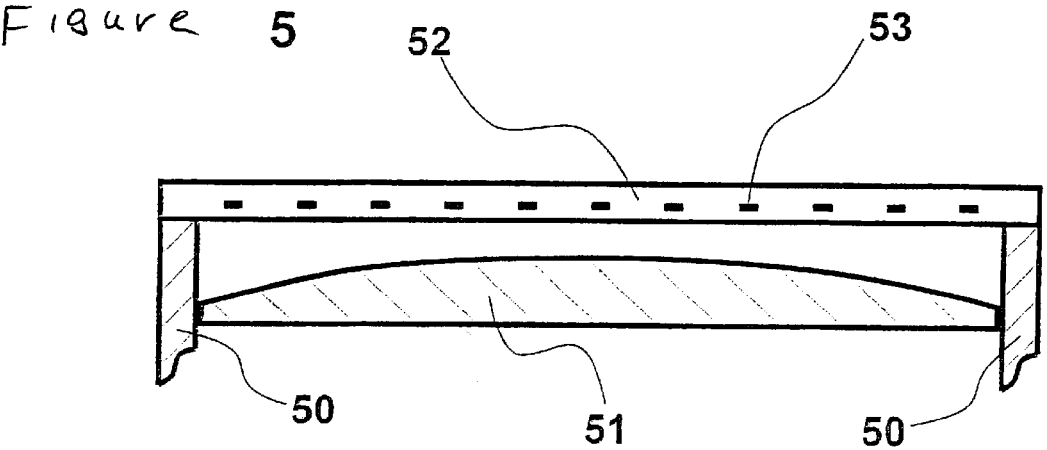
FIG. 5 shows a fourth exemplary embodiment of the motor-vehicle radar system according to the present invention.

FIG. 5 shows a fourth exemplary embodiment of the motor-vehicle radar system according to the present invention. The specific embodiment shown is similar to the specific embodiment according to FIG. 4. A schematically indicated housing 50, a dielectric member 51 and a cover plate 52 are depicted. In contrast to the specific embodiment according to FIG. 4, in the specific embodiment according to FIG. 5, electrically conductive tracks 53 are integrated into cover plate 52. The electrically conductive tracks are made of a material with pronounced positive temperature coefficient in this exemplary embodiment, as well.

In general, it is possible to combine the arrangement of a first and a second dielectric member, as well as the arrangement of the electrical conductor tracks in any way desired. As long as a material having a pronounced positive temperature coefficient is used, these specific embodiments lie within the scope of the motor-vehicle radar system according to the present invention. Arrangements having a higher number of dielectric members, or even arrangements according to FIG. 4 or FIG. 5, in which the first and the second dielectric members directly touch each other are equally possible.

What is claimed is:

1. A motor-vehicle radar system, comprising:
    at least one housing;
    at least one send/receive element for at least one of sending and receiving an electromagnetic wave;
    at least one first dielectric member arranged in a beam path of the electromagnetic wave; and
    at least one arrangement of electrical conductor tracks that are in direct contact with the at least one first dielectric member, wherein:
        an electric power is supplied to the electrical conductor tracks,
        the electrical conductor tracks heat the at least one first dielectric member, and
        the electrical conductor tracks are made of a material having an ohmic resistance that increases substantially with rising material temperature.

2. The motor-vehicle radar system according to claim 1, wherein:
    a distance of the electrical conductor tracks to one another corresponds to an odd multiple of a quarter of a free-space wavelength of the electromagnetic wave.

3. The motor-vehicle radar system according to claim 1, wherein:
    the at least one first dielectric member includes a lens for one of focusing and scattering the electromagnetic wave.

4. The motor-vehicle radar system according to claim 1, wherein:
    the at least one first dielectric member includes a ceramic material.

5. The motor-vehicle radar system according to claim 1, wherein:
    the electrical conductor tracks are produced from an electrically conductive printing paste.

6. The motor-vehicle radar system according to claim 1, further comprising:
    a covering layer applied on the at least one first dielectric member at least on a side facing away from the at least one send/receive element.

7. The motor-vehicle radar system according to claim 6, wherein:
    the covering layer includes a thermoplastic material.

8. The motor-vehicle radar system according to claim 7, wherein:
    the covering layer encloses the at least one first dielectric member in such a way that the covering layer represents a seal with respect to the at least one housing.

9. The motor-vehicle radar system according to claim 6, wherein:
    a dielectric constant of the covering layer corresponds approximately to a square root of a dielectric constant of the at least one first dielectric member.

10. The motor-vehicle radar system according to claim 6, wherein:
    a layer thickness of the covering layer corresponds to an odd multiple of a quarter of a free-space wavelength of the electromagnetic wave.

11. The motor-vehicle radar system according to claim 6, wherein:
    the covering layer corresponds to a reflection-damping adaptation layer that protects the motor-vehicle radar system from a weather influence.

12. The motor-vehicle radar system according to claim 1, wherein:
    the electrical conductor tracks are arranged on a side of the at least one first dielectric member facing the at least one send/receive element.

13. The motor-vehicle radar system according to claims 1, wherein:
    the electrical conductor tracks form a level arrangement.

14. The motor-vehicle radar system according to claim 1, further comprising:
    at least one second dielectric member arranged in the beam path of the electromagnetic wave, wherein:
        the at least one second dielectric member includes a lens for one of focusing and scattering the electromagnetic wave, and
        the at least one second dielectric member is arranged between the at least one send/receive element and the at least one first dielectric member.

15. The motor-vehicle radar system according to claim 14, wherein:
    the at least one second dielectric member is not in direct contact with the at least one first dielectric member.

* * * * *